United States Patent [19]
Lech et al.

[11] 3,805,529
[45] Apr. 23, 1974

[54] VALVE FOLLOW-UP MECHANISM
[75] Inventors: Richard J. Lech, Hickory Hills; Leonard A. Bettin, Lyons, both of Ill.
[73] Assignee: International Harvester Company, Chicago, Ill.
[22] Filed: Aug. 24, 1972
[21] Appl. No.: 283,458

[52] U.S. Cl. .................................. 60/534, 60/547
[51] Int. Cl. ............................................ F15b 7/00
[58] Field of Search ........ 60/54.5 P, 54.6 P, 54.6 E, 60/534, 547; 91/391, 378

[56] References Cited
UNITED STATES PATENTS
3,354,788  11/1967  Garrison et al. ..................... 91/378
3,044,265  7/1962  Schwartz et al. ................. 60/54.6 P
3,237,525  1/1966  Stelzer ............................. 60/54.6 P
3,173,339  3/1965  Larsen ............................. 60/54.6 P
3,054,387  9/1962  Kellogg ............................ 60/54.6 P FOREIGN PATENTS OR APPLICATIONS
693,132  8/1964  Canada ........................... 60/54.6 E Primary Examiner—Edgar W. Geoghegan
Assistant Examiner—A. M. Zupcic
Attorney, Agent, or Firm—John A. Schaerli; Floyd B. Harman

[57]  ABSTRACT
A valve having input and output plungers which are separate and independent. However, in the advent of hydraulic failure on the output side the plungers are connected in a following manner by a linking means thereby signaling the operator of the failure.

6 Claims, 1 Drawing Figure

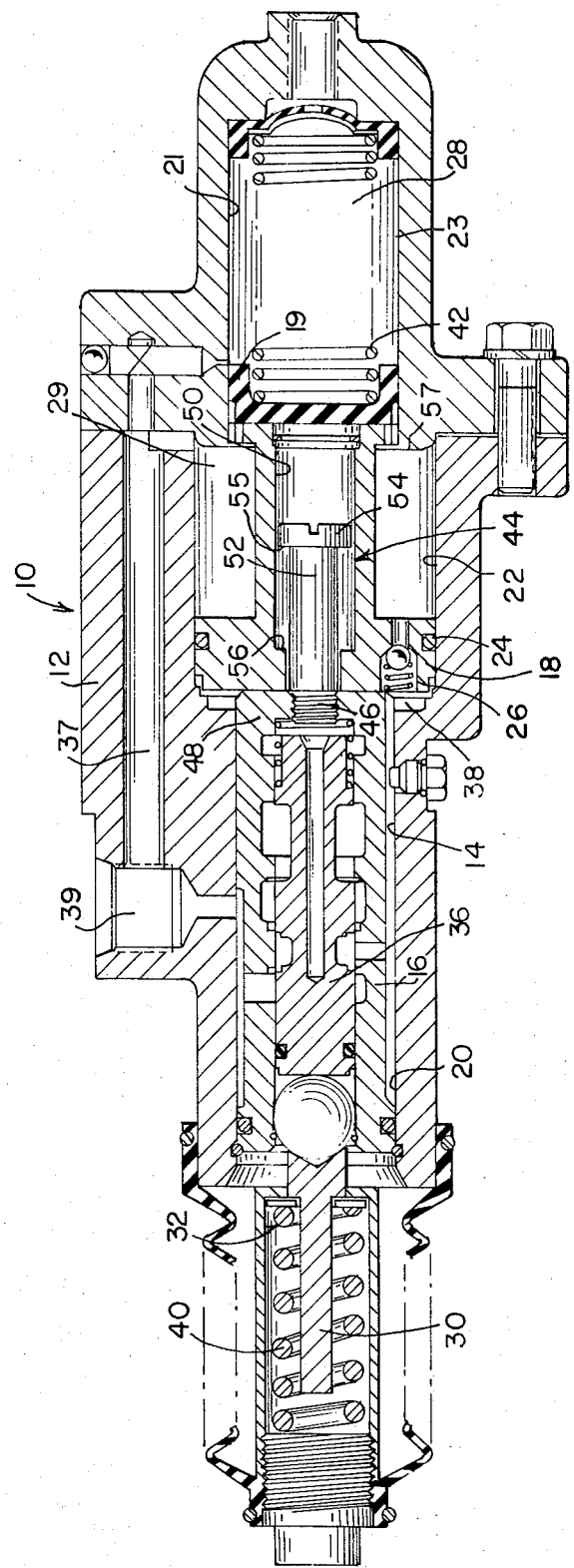

VALVE FOLLOW-UP MECHANISM

BACKGROUND OF THE INVENTION

This invention is related to master cylinders of the split system type, and more particularly to a following means which upon failure on the output side of the cylinder, interconnects the actuating plungers whereby they move as one.

As is known in the construction of power brake systems, first and second plunger means are employed within a housing in conjunction with an external source of high pressure fluid. Basically the first plunger functions as a spool to regulate the flow of high pressure fluid into a power chamber behind the second plunger. The second plunger then exerts force against an external means such as a brake unit. A commonly used form of force transfer means, in a brake unit, is a closed hydrostatic system. As is apparent if a leak develops in the hydrostatic unit or the brake shoes wear, the second plunger will be required to move farther and farther to exert the necessary force. Since the first plunger, which is normally actuated by a pedal, is in no manner connected to the second plunger there is no sensing feedback to indicate the possible system failure. That is, during a normal cycle the first plunger simply admits high pressure fluid which does the actual work. It would thus be desirable to have a means which during a normal cycle would not be involved, however, upon failure or wear would cause notice thereof to be transmitted back to the operator.

It is therefore, an object of this invention to provide a following means for a power brake unit which alerts the operator of brake wear or fluid loss.

Still another object of this invention is to provide a following means which is engaged only on fluid loss or brake wear.

Another object of this invention is to provide a following means which engages if the output plunger travels beyond its normal stroke.

Yet another object of this invention is to provide a power brake assembly having a following means signaling brake shoe wear or brake fluid loss.

In accordance with the invention a means is provided which alerts the vehicle operator to the fact that he may have brake problems developing. The first plunger which admits the high pressure fluid in response to mechanical actuation by the operator is equipped with a following means which is picked up by the brake unit actuating second plunger if the latter moves too far during actuation of the brake shoe assembly. As is apparent the fact of such system failure would not be immediately apparent to the operator since in the prior art assemblies he only actuates the first plunger. In accordance with this invention, however, upon pick-up, the operator will sense the extra pressure needed to actuate the brake pedal. That is immediately it will require more force on the part of the operator to actuate the brakes, because the pick-up has negated some of the effective surface of the first or brake system actuating power chamber.

Other objects and advantages of the invention will become apparent upon reading the following detailed description and upon reference to the drawings, in which:

The FIGURE is a longitudinal section of a dual or split system type master cylinder which incorporates the invention herein disclosed.

Referring now in detail to the drawing, the master cylinder means 10 has a housing 12 having a stepped bore 14 wherein first and second plunger means 16 and 18 are slidably mounted. The diameter of the rear portion means 20 of the bore 14 is less than the diameter of the front portion 22 and the same relationship for first and second reciprocating plunger means 16 and 18. An O ring 24 is located on a shoulder means 26 and sealingly engages the surface of the plunger 18 and bore 22 thereby preventing fluid movement thereacross. The plunger means 18, the end plug or sealing means 19 and side wall 21 of the front portion 23 of bore 14 constitute a first front actuating chamber 28 which actuates the brake shoe means (not shown). The rear portion 15 of plunger 16 and the input means 30 constitute a second or rear actuating chamber 32, responsive to operator actuation. A high pressure fluid means (not shown) via a port (not shown) supplies high pressure fluid to spool 36 whereby, in conjunction with the land and porting system of spool means 36, high pressure fluid can be directed into third power chamber 38 means which exists between plunger means 16 and 18. It is thus possible, by the introduction of force against spool 36 to direct high pressure fluid to power chamber 38 and thereby to subject the plunger 18 to a substantially strong rightwardly driving force. This rightwardly driving force can be against either a hydrostatic or manual transfer means and in the preferred embodiment is against a hydrostatic means. Return spring means 40 and 42 move the plunger means 16 and 18 back to the initial position upon the removal of the external forces. A sealed relationship is maintained between first and third power chambers 28 and 38 by plug means 19, a return to dump passage is provided via channel 37 and port 39 such fluid can be drained from chamber 29.

Located between the respective plunger means 16 and 18 is a following means 44. A first end means 46 of following means 44 is secured to first end portion 48 of plunger 16 by any suitable means. The body portion means 52 thereof, extends away from end portion 48 into front bore portion 22. The body portion 52 and second plunger means 18 exist in a reciprocating relationship, that is, during a normal working cycle they move past each other without load bearing communication therebetween. However, if second plunger 18 moves to the right beyond a predetermined point, following means 44 is picked up and functions as a tension link between first and second plunger 16 and 18 such that a portion of the effective surface of power chamber 38 is negated. As is apparent the operator will be required to physically supply the force to separate following means 44 from second plunger 18, before further braking can be achieved. If the failure is due to a leak in the hydrostatic transfer means the operator will need to continuously exert force, however, if the problem is brake shoe wear he will, each time he actuates the assembly, have to push the pedal (not shown) in slightly further.

In the preferred embodiment of this invention following means 44 is a bolt, which extends a distance into a channel means 50 located in plunger means 18. As is apparent the relative lengths of plunger means 18 and following means 44 can vary, however, the relationship should be such that a substantial amount of plunger 18 travel is possible even after initial pick-up. The channel means 50 is provided with a catch such as a step or base means 56 of such a diameter that the body portion 52 of following bolt means 44 freely reciprocates or moves therein. However, a portion of following bolt means 44 has an expanded diameter means 54 such that passage is impossible, the result being that the following means 44 is picked up. That is surface means 55 contacts step means 56 thereby temporarily connecting plunger means 16 and 18.

As will be apparent, however, from a consideration of invention as disclosed if for some reason there is insufficient fluid in chamber 28 to provide proper actuation of the brake unit and plunger means 18 continues to move to the right, a point will be reached where, because of the length relationship, following means 44 will be picked up. At this point plunger means 18, following means 44, plunger means 16 and mechanical actuation means 30 are connected and an increased operator effort is necessary to perform the braking function. Assuming that a human agent is actuating the brake cylinder means 10 through a brake pedal for instance he will immediately notice an increase in the pressure necessary for actuation. As shown the amount of following means which extends out into channel 50 is shorter than said channel to thereby provide a safety distance such that ample signal will be transmitted to the operator of possible system failure before such failure occurs.

The invention may be embodied in other specific forms without departing from the spirit or essential characteristics thereof. The present embodiments, are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a power brake system for a vehicle having a plurality of hydraulically actuated brake set means including:
   a high pressure fluid generating means;
   a master cylinder means connected to said brake set by a hydraulic line means whereby force is transmitted therebetween;
   hydraulic line means connecting said means whereby a hydraulic circuit is established;
   said master cylinder means including a master piston means;
   first and second bore means having first and second axially spaced plunger means therein said second plunger means delivering force to said master piston means;
   said first plunger means controlling high pressure fluid flow generated by said high pressure fluid generating means;
   a following means extending between said plunger means being carried by one thereof and engageable by the other upon hydraulic failure in said brake set, and a power chamber means between said first and second plunger means the effective area of said power chamber means being reduced when said following means engages said other plunger upon hydraulic failure in said brake set means.

2. The braking system of claim 1 wherein:
   the length relationship of said engaging plunger and said following means is such that travel of said engaging plunger is possible after said following means engages and moves with said plunger; and
   said first plunger means includes a valve spool means subject to manual actuation whereby controlling the flow of high pressure fluid to said power chamber.

3. The braking system of claim 2 wherein:
   said engaging plunger has a transversely extending channel means and said following means extends into said channel means, whereby only at a certain point of travel of said engaged plunger is said following means picked up.

4. The braking system of claim 3 wherein said following means has a shaft portion extending into said channel means and said shaft carries a plunger engaging means.

5. The braking system of claim 4 wherein said following means is a bolt.

6. In a combination high pressure fluid generating means and a valve means acting upon the master cylinder of a hydraulic braking system said valve including:
   a valve housing means having a longitudinal extending bore means, a first and second plunger means located in said bore means creating a power chamber therebetween, said first plunger having a valve means subject to external force whereby high pressure fluid is admitted to said power chamber means and said second plunger means acts upon said master cylinder,
   a following means secured to said first plunger means and moving adjacent said second plunger means whereby if a hydraulic failure in said hydraulic braking occurs said following means connects said first and second plunger means.

* * * * *